Figure 1:
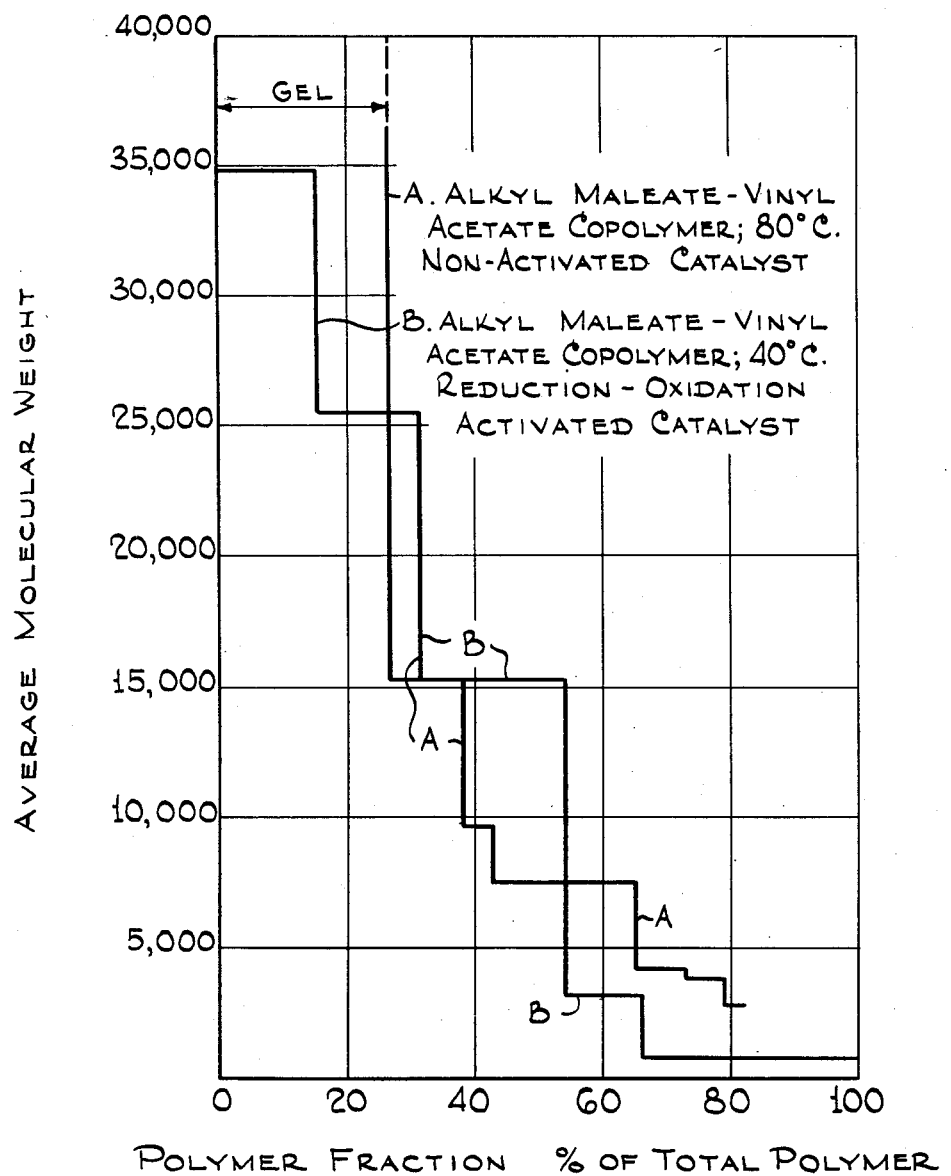

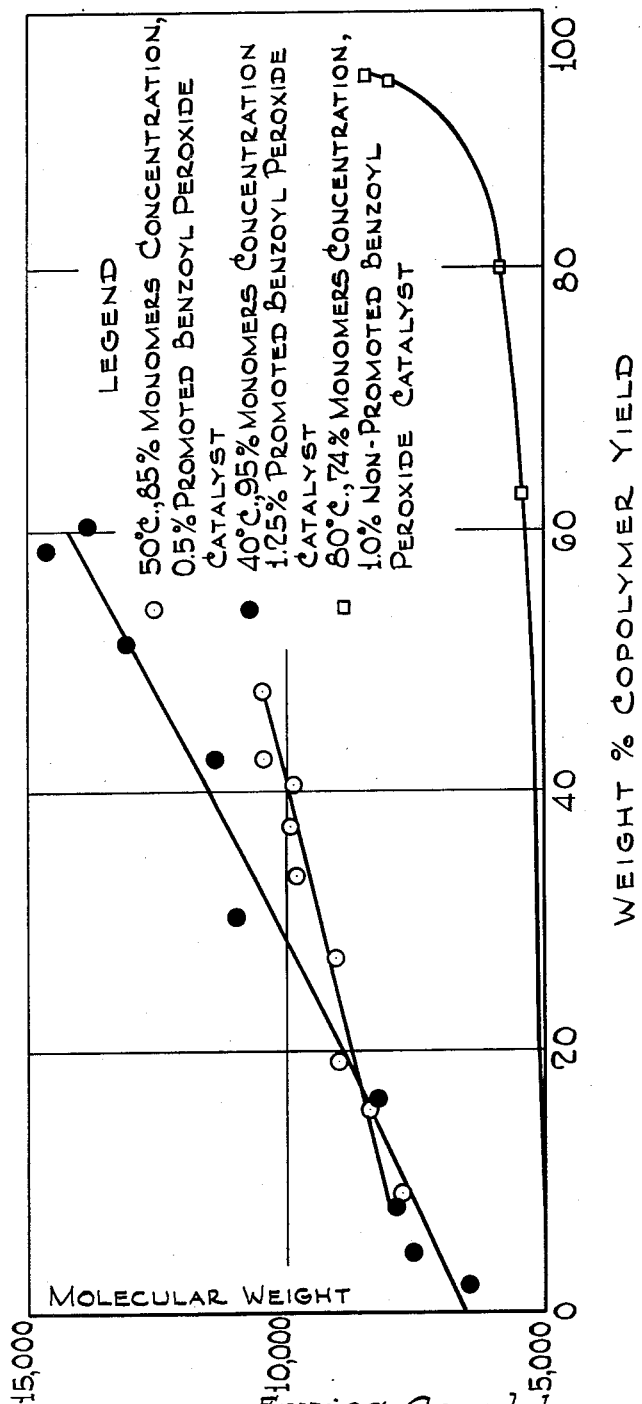

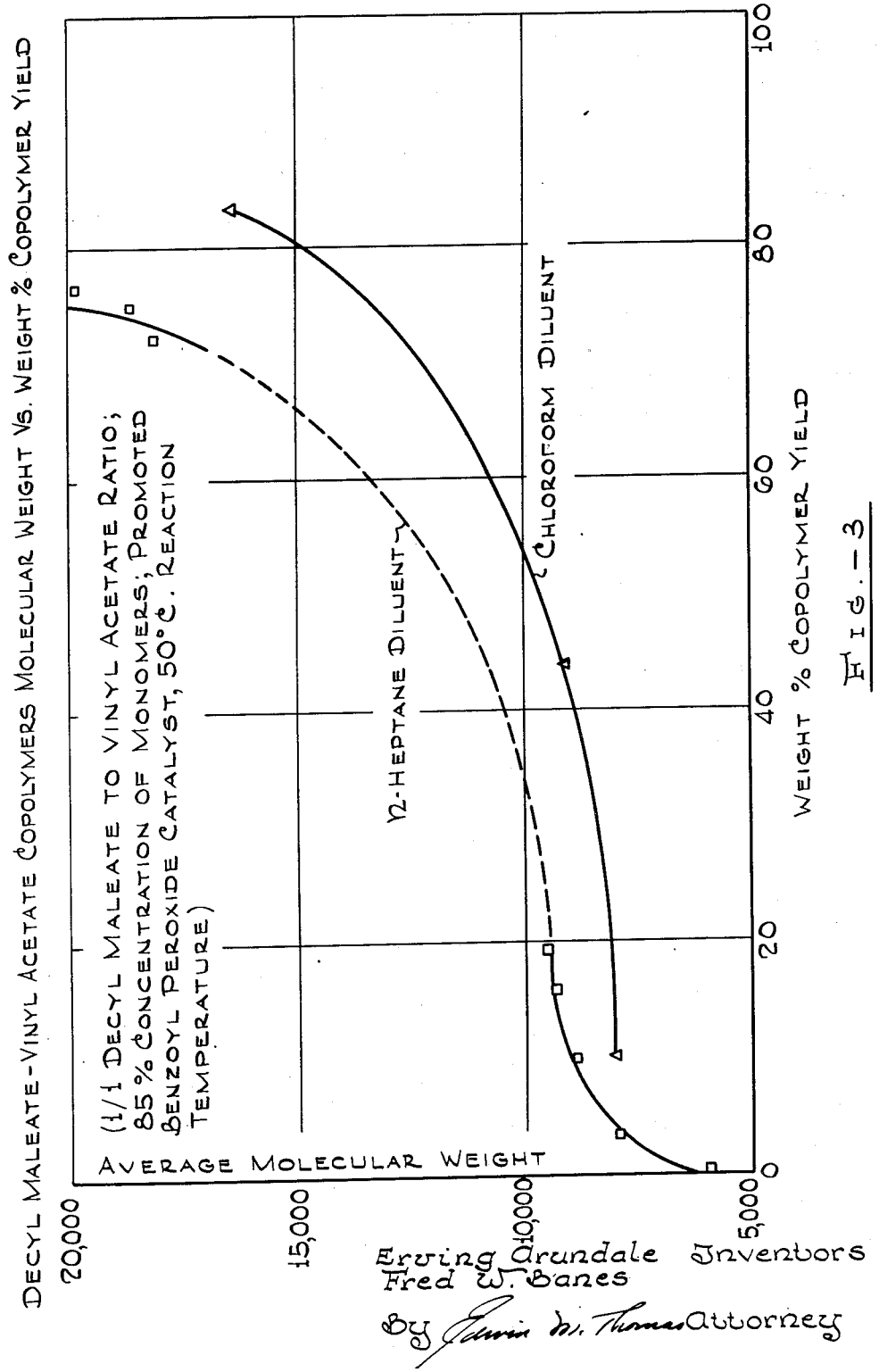

Patented Feb. 10, 1953

2,628,198

UNITED STATES PATENT OFFICE 2,628,198

ALKYL MALEATE-VINYL ACETATE COPOLYMERS

Erving Arundale and Fred W. Banes, Westfield, N. J., assignors to Standard Oil Development Company, a corporation of Delaware Application March 31, 1951, Serial No. 218,678

10 Claims. (Cl. 252—56)

The present invention relates to lubricating oil compositions and improved methods for their preparation. This application is a continuation-in-part of Serial No. 41,676 filed July 30, 1948, now abandoned.

In a copending application, Serial No. 728,727, filed February 14, 1947, now abandoned, by J. H. Bartlett, there is disclosed an invention involving the preparation of lubricating compositions containing maleate ester-vinyl ester type copolymers. Such copolymers are particularly useful in lubricating oils and the like to improve viscosity index characteristics and to lower their pour points. The copolymers have been found to be quite satisfactory for these purposes in various respects. However, prior to the present invention, difficulties sometimes have been encountered in the relatively poor shear stability of the copolymers. This is due, apparently, to the presence in such copolymers of components of widely varying molecular weights.

Lubricating oils used under many conditions are subjected to high rates of shear and to extensive mechanical working. This is particularly true where high pressures and high speeds of the lubricated parts are involved. Under such conditions it is obviously desirable that all of the ingredients contained in such lubricants, such as pour depressants, viscosity index improvers, or any other modifiers be highly stable against breakdown due to shear.

The copolymers used prior to the present invention and prepared under the conditions set forth generally in the aforesaid prior application of Bartlett have commonly possessed an average initial molecular weight of around 5,000 to 8,000, as determined by the Staudinger equation, molecular weight $= \ln(Vs/Vo)/C \times 3.13 \times 10^{-6}$ where $C$ is the concentration in milligrams of polymer per cc. of diisobutylene, $Vs$ is the viscosity in centistokes of a solution of concentration $C$, and $Vo$ is the viscosity in centistokes of diisobutylene. Lubricants incorporating as modifiers the products of polymerization processes previously used seem to have certain limitations. It is an object of the present invention to overcome such deficiencies.

For shear stability in polymeric ingredients, it is apparently quite essential that the polymers be of reasonably uniform composition and molecular weight. Hitherto, in the polymerization reaction, polymers of this general type have been formed initially with a rather low molecular weight until about 75% to 90% conversion was accomplished. Thereafter, during the final 10% to 25% of conversion, there was a very rapid increase in molecular weight which brought the average molecular weight of the total polymer up to a desired level. The end products so produced were relatively of very high molecular weight. These end polymer products had a gel-like character which rendered them somewhat oil-insoluble and particularly subject to breakdown upon shear.

The gel-like or heavy end components of the prior copolymers of alkyl maleate-vinyl ester type apparently are cross-linked to some degree—at any rate, the heavy ends are not effective components so far as pour point depressing activity in paraffinic oils is concerned. Relatively high molecular weight of additive is desirable for viscosity index improvement, but even for the latter purposes, the very heavy ends are undesirable. They also appear largely to be the cause of the shear instability referred to above.

In view of the foregoing, it appears that a good lubricating oil should contain a more uniform copolymer, i. e., one having a narrower molecular weight range and more nearly constant composition throughout the polymerization process, for optimum improvement in pour point and viscosity index. The distribution of molecular weight should not be unduly broad. In fact, it is desirable that there be definite limits both on the molecular weight and on the proportion of the high molecular weight end product. It is an object of the invention to employ as lubricant additive products of a polymerization process so controlled that the molecular weight is held within proper limits.

According to the present invention, it has been found that the molecular weight of alkyl maleate-vinyl ester type copolymers can be made more uniform by specific choices of copolymerization temperatures, catalysts, and promoters. Also, if desired, the average molecular weight may be increased quite substantially without producing extremely heavy end products. Specifically, it has been found that copolymers suitable for addition to lubricating oils, having average molecular weights as high as 15,000 to 25,000 or more, may be produced in this manner, without the polymerization end product having an excessively high molecular weight or without the proportion of such high molecular weight ends as are produced exceeding a desired minimum. It is considered desirable that none of the product have a molecular weight substantially above about 40,000 and that not more than 20%, preferably not more than 15%, exceed 25,000 molecular weight.

The copolymers are of the $C_8$ to $C_{20}$ alcohol esters of maleic acid or anhydride and vinyl acetate type. Homologous materials such as the corresponding itaconate esters, and alkyl acetates, etc. may also be used. Specifically, the $C_{10}$ to $C_{16}$ alkyl esters, such as the decyl, lauryl, "Lorol B" ($C_{10}$ to $C_{16}$ saturated aliphatic alcohol) of maleic acid or anhydride are preferred.

Other conditions being equal, it is generally found that the average molecular weight of a polymer or copolymer of the general type under consideration here increases as the polymerization temperature is lowered. Using ordinary catalysts, however, it may not be possible to secure polymerization at all when the temperature is lowered substantially below a critical limit. Thus with the decyl maleate-vinyl acetate (or "Lorol B" maleate-vinyl acetate) copolymerization, for example, using a peroxide catalyst such as benzoyl peroxide, polymerization which proceeds readily at 70° C. may not proceed at all at a slightly lower temperature, for example, of 30° to 60° C.

By activating the catalyst, an especially by using a reduction-oxidation activation technique, the polymerization may be conducted at the lower temperature which produces higher average molecular weight. The resulting copolymer has higher average molecular weight in the initial stages of polymerization and, in addition, the molecular weight may be maintained more nearly constant throughout copolymerization. The comparison between the two processes mentioned, as applied to decyl maleate-vinyl acetate copolymers with and without the activation technique, is shown graphically in Figure 1 of the drawings. It will be noted that the area under graph A, in the higher molecular weight range, is much greater than under graph B. The same behavior applies to "Lorol B" (mixed $C_{10}$ to $C_{16}$) maleate-vinyl acetate copolymers.

Certain other factors, in addition to the particular catalyst and catalyst activator, appear also to have a marked effect on the quality and molecular weight of the polymer. Thus the choice of solvent and the ratio in molar proportions between the respective esters to be copolymerized exercise significant effects on the final product. Under some conditions, molecular weight remains quite constant throughout the polymerization whereas under others it increases gradually at first and more rapidly as polymerization approaches completion. Under still other conditions, the molecular weight rises rapidly and uniformly from the outset. Several examples of these varied phenomena are shown graphically in Figures 2 and 3 of the drawings. Figure 2 shows comparisons between promoted and non-promoted catalysts at different temperatures, and Figure 3 shows the relative effects of different diluents.

The invention may be further described in detail by reference to the following examples and the data which accompany them.

*Example I*

A copolymer of decyl maleate and vinyl acetate was prepared by combining these materials in 1 to 1 molar ratio using 15% by weight of a suitable diluent. In this particular example, the diluent was chloroform. Other diluents such as n-heptane, toluene, methyl ethyl ketone, diisobutyl ketone, isopropyl ether, ethyl acetate, methylene chloride, and pyridine may be used, though not entirely equivalent in all respects. Using 1.25% by weight, based on the reactant materials, of benzoyl peroxide as catalyst, with 1.25% of benzoin and 0.05% of ferric laurate as promoters, with a polymerization temperature of 50° C., a product was obtained having an average molecular weight of 16,500 Staudinger. The actual polymer obtained appears to contain about 0.8 mol of decyl maleate per mol of vinyl acetate. This composition was fairly uniform throughout the copolymerization. At 10.4% conversion, the ratio of decyl maleate to vinyl acetate was 0.79. At 44.2% conversion, it was 0.80, and at 83.5% conversion, it was 0.81.

EXAMPLE II

The choice of solvent apparently has some effect on the uniformity of composition and for this reason chloroform is preferred. See Figure 3. However, there are greater differences between promoted and non-promoted polymers produced at a given temperature than between polymers produced by identical methods in different solvents. For comparative purposes, several copolymers of identical esters were prepared. In one case, when n-heptane was used as solvent, the ratio of decyl maleate to vinyl acetate was 0.87 at 2% conversion, 0.77 at about 5% conversion, 1.02 at 42.6% conversion, and 1.05 at 58.8% conversion, showing a wider variation in composition of the copolymer at various stages in the process than in the previous example. When a copolymer was produced in heptane at 70° C. by the conventional method, without activation, the ratio of decyl maleate to vinyl acetate in the product was 0.75 at 5.8% conversion. The ratio increased to 0.88 at 34.6% conversion, 1.22 at 52.7% conversion, and 1.28 at 62.0% conversion. Other differences in the effects of solvents are noted below.

The product of Example I, with an indicated molecular weight of about 16,500 Staudinger was added to a standard high grade SAE 20 motor oil base having a viscosity index of 115 and a viscosity of about 72 S. S. U. at 210° F. The quantity of polymer used was 2.9% based on the finished product. The viscosity index of the oil was raised to 148.

The treated oil just described was given a shear test by passing it 150 times through a recycle viscometer at 300 p. s. i. g. The shear test showed a loss in viscosity of the treated oil of 11.4%.

EXAMPLE III

By comparison, another vinyl acetate-decyl maleate copolymer was made with the aid of 1.25% benzoin, 0.05% ferric laurate, and 1.25% benzoyl peroxide catalyst, based on the weight of the reactants. Polymerization was carried out in the presence of 15% n-heptane, based on the weight of the final solution as a diluent at 50° C. This product had an average molecular weight of about 19,800 Staudinger. When added in similar proportions to the base oil of Example I, i. e., an oil of 72 S. S. U. viscosity at 210° F. with a viscosity index of 115, the viscometer shear test showed a breakdown of 17.6% as compared with 11.4% for the product of Example I. This may have been due in part, but not entirely, to the higher molecular weight. When another copolymer prepared in the presence of n-heptane diluent and having a molecular weight of only 14,700 was tested, it showed a breakdown in the same oil of 14.4%.

As indicated above, the proportions of the two compounds to be copolymerized may be varied somewhat, but in general the ratios preferably are not far from equimolar. Thus the ratio should be no greater than 1 to 2 mols of the maleate ester to 1 to 2 mols of the vinyl ester, and preferably the limits are considerably narrower. A particularly preferred range for the alkyl maleate-vinyl acetate copolymers is 0.8 to 1.25 mols of the decyl maleate for each mol of the vinyl acetate.

From the experimental data it appears that a high molecular weight product may be prepared with a reasonable uniformity in molecular weight throughout the copolymerization process. This is accomplished by conducting the reaction at a temperature within the range of 30° to 60° C. with suitably activated peroxide type catalyst. Specifically, "Lorol B" or decyl maleate and vinyl acetate copolymers, of the general character and properties referred to in said prior application, have been prepared successfully at a temperature of 50° C. using benzoyl peroxide as a catalyst in proportions of 0.5 to 1.5% by weight based on the reactant monomers being polymerized. Under some conditions, the quantities may be as low as 0.1 or as high as about 5%. This catalyst is activated by an oxidation-reduction type activator consisting preferably of 0.05% of an oxidizing agent such as ferric laurate, or more broadly 0.01 to 0.5%, and 0.1 to 5%, preferably 0.5 to 1.25% of a reducing agent such as benzoin. The effectiveness of the activator is clearly shown because in its absence no substantial polymerization would have occurred under ordinary conditions at the temperature employed of 50° C. By use of the activating materials, polymers have been prepared having average molecular weights ranging from 7,000 or less up to about 20,000. Most of these have been found to be both good viscosity index improvers and pour depressants and to have improved shear stability. While polymers of 12,000 to 20,000 molecular weight Staudinger are ordinarily preferred, those of considerably lower molecular weight, e. g., as low as about 7,000, are also useful when they are reasonably uniform in composition and in molecular weight.

Thus, polymers prepared at 50 C., using the activating materials and the catalyst mentioned above, have been found to be more stable in shear than copolymers prepared at 80° C., with the same catalyst and without the activator materials. The following table shows comparative data of several different samples of polymers prepared at various temperatures and blended in lubricating oils of viscosity of 45 S. S. U. at 210° F. Losses in viscosity due to shear are indicated in the next to the last column. Compositions A to F were all decyl maleate vinyl acetate copolymers containing approximately 17% by weight of vinyl acetate and 83% of the maleate ester. Their average molecular weight ranged approximately from 13,000 to 20,000. The high molecular weight ends were reduced in the promoted catalyst processes.

example of 50° C., using the promoted catalyst, retains these excellent properties while at the same time providing the additional advantage of excellent shear stability. The preferred composition of this present invention, having an average molecular weight between about 7,000 and 20,000, is required in smaller quantity than the higher temperature polymerization product for raising the viscosity index of a base motor oil of good quality from 115 to 140 V. I. This particular oil is a solvent extracted Mid-Continent crude, blended with a small amount of a Pennsylvania bright stock. A straight Pennsylvania base oil of 100 viscosity index may be raised to 125 by less than 1% of the material of polymer A, Table 1, whereas one base oil of Coastal Crude derivation had its viscosity index raised from 64 to 100 by the use of only 1.1% of the same polymer.

Polymers prepared according to the above example and having molecular weights of 8,000 and 20,000 showed good shear stability as determined by viscosity measurements of oil-additive blends after 150 passes in a recycle viscometer at 300 p. s. i. g. The polymers of lower average molecular weight are superior in this respect. However, as previously suggested, it appears to be the heavy end polymers which cause the shear breakdown and the proportion in which these are present determines the shear breakdown to a large degree.

It will be observed that the percentage loss in viscosity is very low in the cases of the promoted catalyst polymers. In general, copolymers prepared at the lower temperature by use of an activated catalyst seem to show less breakdown than polymers of the same average molecular weight, prepared at the higher temperature. This appears to be due to the presence of particularly heavy end components, i. e., products of very high molecular weight, in the non-activated catalyst product. In Table 1, above, the copolymer of 19,800 average molecular weight, prepared with activated catalyst at 50° C. showed considerably less breakdown than a copolymer of the same average molecular weight prepared at 80° C. without activation. The same was found to be true of copolymers having molecular weights of about 9,600 and 14,700. In the table, copolymer C prepared at 80° C. without activation, contained 27% of a high molecular weight gel which was oil insoluble. See Figure 1 of the drawing. The molecular weight range varied all the way from 2,000 to more than 40,000, with a considerable proportion above 25,000.

*Table 1*

| Polymer | Reaction Temp., °C. | Solvent | Percent Polymer | Mol Wt. | V. I. | Percent Loss Vis./210° F. on Polymer [1] | Percent V. I. Loss |
|---|---|---|---|---|---|---|---|
| A | 50 | CHCl₃ | 2.9 | 16,500 | 148.0 | 11.4 | |
| B | 50 | Heptane | 2.74 | 19,800 | 145.0 | 17.6 | |
| C | 80 | | 3.0 | 19,300 | 148.0 | 21.6 | |
| D | 70 | CHCl₃ | 5.1 | 11,000 | 146.0 | 15.5 | 5.5 |
| E | 50 | CHCl₃ | 5.3 | 10,500 | 143.8 | 7.0 | 1.1 |
| F | 40 | CHCl₃ | 6.0 | 10,500 | 143.4 | 5.8 | 0.5 |

[1] 150 passes, 300 p. s. i. g.

As mentioned in the aforesaid prior application, the alkyl maleate-vinyl ester copolymer described therein compared very favorably with commercial additives in improved viscosity index and has excellent pour stability in oil which is subjected to repeated fluctuation in temperatures above and below its pour point. The product prepared as described above at a temperature, for example of 50° C., using the promoted catalyst, This reduction in proportion of high molecular weight ends is an important aspect of this invention. As shown in Figure 1, with the activated catalyst technique, only 15% of the polymer has a molecular weight above 25,000, about 17% between 15,000 and 25,000, about 22% between 3,000 and 15,000, and about 46% below 3,000. It is desirable that not more than 20%, by weight, be above about 25,000.

Chloroform is the preferred solvent for polymerization, as suggested above, though others may be used. In composition A of Table 1, a yield of 84% of copolymer was obtained using chloroform solvent and the activation technique at 50° C. Using heptane as the solvent under the same conditions, the yield was only 74%. The shear breakdown of polymer A was 11.4% as compared with 17.6% for the heptane solvent product, polymer B, which had a somewhat higher molecular weight of 19,800. Another heptane solvent product of 14,700 molecular weight prepared at 40° C. still showed a shear breakdown of 14.4% and it required 3.75% to raise the same oil of 115 viscosity index to 145. Notwithstanding the evident superiority of chloroform, heptane and other solvents listed above may be substituted therefor with reasonably satisfactory results.

At higher temperatures, e. g., 70° to 80° C. or higher, the reduction-oxidation activation technique appears to be less useful. In one test a product prepared using such technique had a lower molecular weight and actually gave a lower yield than the unactivated catalyst at the same temperature. The reason for this is not entirely clear, but it is believed that too active a catalyst starts too many nuclei for polymerization simultaneously so that the molecular weight can not reach a very high value. A reasonably high molecular weight product is required for lowering the pour point and also increasing the viscosity index of mineral lubricating oils. As indicated in Figure 1, the process of this invention reduces the lower molecular weight components as well as the higher.

The peroxide catalyst preferred is benzoyl peroxide, but the others such as acetyl peroxide, tertiary butyl hydro peroxide, dibensaldiperoxide, aralkylhydroperoxide, tertiary butyl perbenzoate, and the like, may be used as previously mentioned. The following table shows results of using 1.25% of each of these at a temperature of 50° C., with and without promoters:

*Table 2*

| | Without Promoters | | With 1.25% benzoin and 0.05% ferric laurate | |
|---|---|---|---|---|
| | Yield, Percent | Average Mol Wt. | Yield, Percent | Average Mol Wt. |
| Bensoyl peroxide | 27 | 8,000 | 57 | 8,600 |
| Acetyl peroxide | 19 | 8,000 | 46 | 8,400 |
| Tertiary butyl hydroperoxide | 0 | | 0 | |
| Dibenzaldiperoxide | 20 | 7,600 | 47 | 8,000 |
| Aralkylhydroperoxide | 7 | 5,400 | 26 | 5,400 |
| Tertiary butyl perbenzoate | 7 | 9,000 | 28 | 10,300 |

As to the concentration of catalyst, e. g., benzoyl peroxide, best results are generally secured by using concentrations of 0.5 to 1.25%. The following data were secured using an 85% concentration by weight of the monomers decyl maleate and vinyl acetate with 15% of chloroform at 50° C. The molar ratio of the reactants was 1 to 1. Benzoin and ferric laurate were used as promoters. The effect of varying these is also shown.

*Table 3*

| Concentration by Weight, Percent | | | Reaction Time, Hrs. | Yield, Percent | Staudinger Average Mol Wt. |
|---|---|---|---|---|---|
| Benzoyl Peroxide | Benzoin | Ferric Laurate | | | |
| 1.25 | | | 1.5 | 0 | |
| 1.25 | | | 4 | 0 | |
| 1.6 | 1.25 | 0.05 | 1.5 | 23 | 7,900 |
| 1.6 | 1.25 | 0.05 | 4 | 42 | 8,600 |
| 1.25 | 1.25 | 0.05 | 1.5 | 27 | 8,000 |
| 1.25 | 1.25 | 0.05 | 4 | 52 | 8,700 |
| 0.5 | 1.25 | 0.05 | 1.5 | 28 | 7,700 |
| 0.5 | 1.25 | 0.05 | 4 | 57 | 8,000 |
| 0.1 | 1.25 | 0.05 | 1.5 | 21 | 7,030 |
| 0.1 | 1.25 | 0.05 | 4 | 21 | 6,700 |
| 1.25 | 0.5 | 0.05 | 1.5 | 14 | 8,400 |
| 1.25 | 0.5 | 0.05 | 4 | 38 | 9,200 |
| 1.25 | 0 | 0.05 | 1.5 | 0 | |
| 1.25 | 0 | 0.05 | 4 | 0.6 | 8,800 |
| 1.25 | 1.25 | 0.01 | 1.5 | 7 | 7,900 |
| 1.25 | 1.25 | 0.01 | 4 | 20 | 8,600 |
| 1.25 | 1.25 | 0.0 | 1.5 | 0 | |
| 1.25 | 1.25 | 0.0 | 4 | 0.5 | |

The following table shows results, using a vinylacetate copolymer with an ester of maleic acid prepared by reacting with maleic acid or anhydride a commercial mixture of $C_8$ to $C_{16}$ aliphatic alcohols, predominantly saturated, obtained from coconut oil and sold under the trade name "Lorol B" alcohol. These products were generally similar to the decyl maleate-vinyl acetate copolymers. X, Y and Z, respectively, were the benzoyl peroxide catalyst, the benzoin promoter, and the ferric laurate promoter.

*Table 4*

| Sample No. | Percent Vinyl Acetate | Reaction Temp. °C. | Time hrs. | Percent X | Percent Y | Percent Z | Viscosity [1] |
|---|---|---|---|---|---|---|---|
| V-242 | 30 | 50 | 30 | 2.25 | 2.25 | 0.09 | 494 |
| V-243 | 30 | 50 | 22 | 2.5 | 2.5 | 0.1 | 1,090 |
| V-244 | 30 | 50 | 51 | 2.5 | 1.25 | 0.05 | 373 |
| V-245 | 30 | 50 | 24 | 2.38 | 2.38 | 0.095 | 1,960 |
| V-253 | 20 | 50 | 48 | 3.0 | 3.0 | 0.12 | 409 |
| V-254 | 20 | 50 | 24 | 3.5 | 3.5 | 0.14 | 416 |
| V-255 | 15 | 50 | 22 | 4.0 | 4.0 | 0.16 | 788 |
| V-256 | 20 | 50 | 22 | 3.0 | 3.0 | 0.12 | 848 |
| V-257 | 20 | 50 | 22 | 3.5 | 3.5 | 0.14 | 627 |
| V-260 | 20 | 68 | 24 | 3.0 | | | 744 |
| V-261 | 20 | 68 | 16 | 3.25 | | | [2] 4,849 |

[1] Viscosity S. S. U. at 210° F. of a 20% blend in mineral oil of about 43 S. S. U. at 210° F.
[2] Thickened to a gel.

In the examples of Table 4, a light mineral oil diluent was used in samples V-242-5, V-256, V-259-60. Chloroform was used (20 to 30%) in samples V-254, 255, and 257 and a mixture, 35% chloroform, 5% oil, in V-253.

In several of the examples given above, $C_8$ to $C_{16}$ alkyl maleate and vinyl copolymers were prepared at 50° C. with specific quantities of monomeric benzoyl peroxide, ferric laurate and benzoin. However, equivalent substitute catalysts and activators may be used as mentioned above and the temperature and other conditions may be varied somewhat depending upon the activity of the catalyst, the effectiveness of the promoter, and the type of solvent. Thus, the temperature may be varied from about 30° C. to about 60° C. The time varies, but ordinarily will be between 10 and 48 hours. With benzoyl peroxide, the catalyst quantity may be varied from 0.1 to about 5% by weight, based on the total mixture, although the upper limit is usually about 3½ to 4%. The ferric laurate may vary from 0.01 to 0.5% and the benzoin from 0.1 to about 5% on the same basis as indicated above.

Other combinations of catalysts and of oxidizing-reducing agents may be useful. For example, other peroxides such as p-chlorobenzoyl peroxide, p-bromobenzoyl peroxide, lauroyl peroxide, cumene hydroperoxide, and the like, may be used instead of benzoyl peroxide as the catalyst. Other ferric salts of oil soluble fatty acids such as oleic, stearic, palmitic and related acids may be used as oxidizing agents instead of ferric laurate. Various oil soluble reducing agents containing hydroxy or carbonyl groups, or both, may replace benzoin. Some examples of such compounds are acetol, diacetone alcohol, diacetyl acetone, and acetonyl acetone.

Although the foregoing description has referred particularly to maleate esters and vinyl acetate, other maleate, fumarate, acrylate, methacrylate, itaconate or aconitate esters may be polymerized alone or with vinyl compounds. In lieu of vinyl acetate, methacrylates, styrenes, alkylated styrenes, and various other esters may be used as set forth more fully in the now abandoned Bartlett application Serial No. 728,727, mentioned above. The essential feature of the present invention is that polymerization, at an appropriate and suitable molecular weight distribution, may be reliably controlled. Temperatures may be used which are lower than those at which the peroxide catalysts are normally active by using the reduction-oxidation type activators. By this means, the molecular weight spread is restricted.

Compositions of the type referred to above, may be used as modifiers for lubricating oils, and the like, in varying quantities as set forth more fully in the aforesaid abandoned Bartlett application. In general, they are added in proportions of 0.01% to 20%, preferably not more than 5%.

What is claimed is:

1. A lubricating composition consisting of mineral base lubricating oil of a viscosity of 35 to 800 S. S. U. at 210° F. and 0.01 to 20% of a $C_8$ to $C_{20}$ alkyl maleate vinyl acetate copolymer having an average molecular weight of 7,000 to 25,000, and having a maximum molecular weight of not more than 40,000, said polymer being polymerized in the presence of an inert organic solvent and from about 0.1% to 5.0% by weight of a peroxide catalyst at a temperature of from about 30° to 60° C., said copolymerization being promoted by about 0.01 to 5% by weight of a ferric salt of a long chain fatty acid as an oxidizing agent and about 0.1 to 5.0% of an oil soluble organic reducing agent selected from the class consisting of benzoin, acetal, diacetone alcohol, diacetyl acetone and acetonyl acetone as a reduction-oxidation agent activator combination.

2. A composition consisting essentially of mineral base lubricating oil of a viscosity of 35 to 800 S. S. U. at 210° F. containing 0.01 to 5%, based on the total composition, of a $C_8$ to $C_{16}$ alkyl maleate-vinyl acetate copolymer having an average molecular weight within the range of 7,000 to 25,000, a maximum molecular weight range of about 40,000, with not more than 20% of its weight above 25,000, said polymer having high shear stability under severe mechanical working, said polymer having been produced by copolymerizing maleate ester and vinyl acetate in the presence of an inert organic solvent and from about 0.1 to 5.0% by weight of a peroxide catalyst at a temperature of from about 30° to 60° C., said copolymerization being promoted by about 0.01 to 5% by weight of a long chain fatty acid as an oxidizing agent and about 0.1 to 5% of an oil soluble organic reducing agent selected from the class consisting of benzoin, acetal, diacetone alcohol, diacetyl acetone, and acetonyl acetone as a reduction-oxidation agent activator combination.

3. A composition consisting essentially of mineral lubricating oil containing 0.01 to 5% by weight, based on the final composition, of a $C_8$ to $C_{16}$ alkyl maleate-vinyl acetate copolymer of uniform composition within the range of 0.8 to 1.25 mols of maleate ester per mol of vinyl acetate, an average molecular weight predominantly within the range of 7,000 to 25,000, not more than 15% by weight of said polymer having a molecular weight in excess of 25,000, said polymer having high shear stability under severe mechanical working said polymer having been produced by copolymerizing maleate ester and vinyl acetate in the presence of an inert organic solvent and from about 0.1 to 5.0% by weight of a peroxide catalyst at a temperature of from about 30° to 60° C., said copolymerization being promoted by about 0.01 to 5% by weight of a long chain fatty acid as an oxidizing agent and about 0.1 to 5% of an oil soluble organic reducing agent selected from the class consisting of benzoin, acetal, diacetone alcohol, diacetyl acetone, and acetonyl acetone as a reduction-oxidation agent activator combination.

4. Composition according to claim 3 wherein said average molecular weight range is 15,000 to 20,000.

5. An oil composition comprising a major proportion of lubricating oil and a minor proportion of a copolymer of a $C_8$ to $C_{16}$ alkyl maleate with vinyl acetate, prepared by combining 0.8 to 1.25 mols of the maleate with the acetate and copolymerizing in the presence of an inert organic solvent and of 0.1 to 5%, based on the weight of the total ingredients, of benzoyl peroxide, activated with 0.01 to 5% of ferric laurate and 0.1 to 5% of benzoin, on the same basis, polymerization being carried out at a temperature between 30° and 60° C.

6. Composition according to claim 5 wherein said alkyl maleate is decyl maleate.

7. Composition according to claim 5 wherein said alkyl maleate is "Lorol B" maleate.

8. Composition according to claim 5 wherein said copolymer is prepared at about 50° C. and over a period of 10 to 48 hours.

9. Composition according to claim 1 wherein the catalyst is benzoyl peroxide.

10. Composition according to claim 1 wherein the catalyst is acetyl peroxide.

ERVING ARUNDALE.
FRED W. BANES.

REFERENCES CITED

The following references are of record in the file of this patent:

UNITED STATES PATENTS

| Number | Name | Date |
|---|---|---|
| 2,542,542 | Lippincott et al. | Feb. 20, 1951 |
| 2,570,788 | Giammaria | Oct. 9, 1951 |
| 2,616,851 | Giammaria | Nov. 4, 1952 |